Feb. 24, 1953     H. A. BEIL     2,629,768
ARCUATE ROLLER CONVEYER FOR CABLES
Filed July 10, 1951
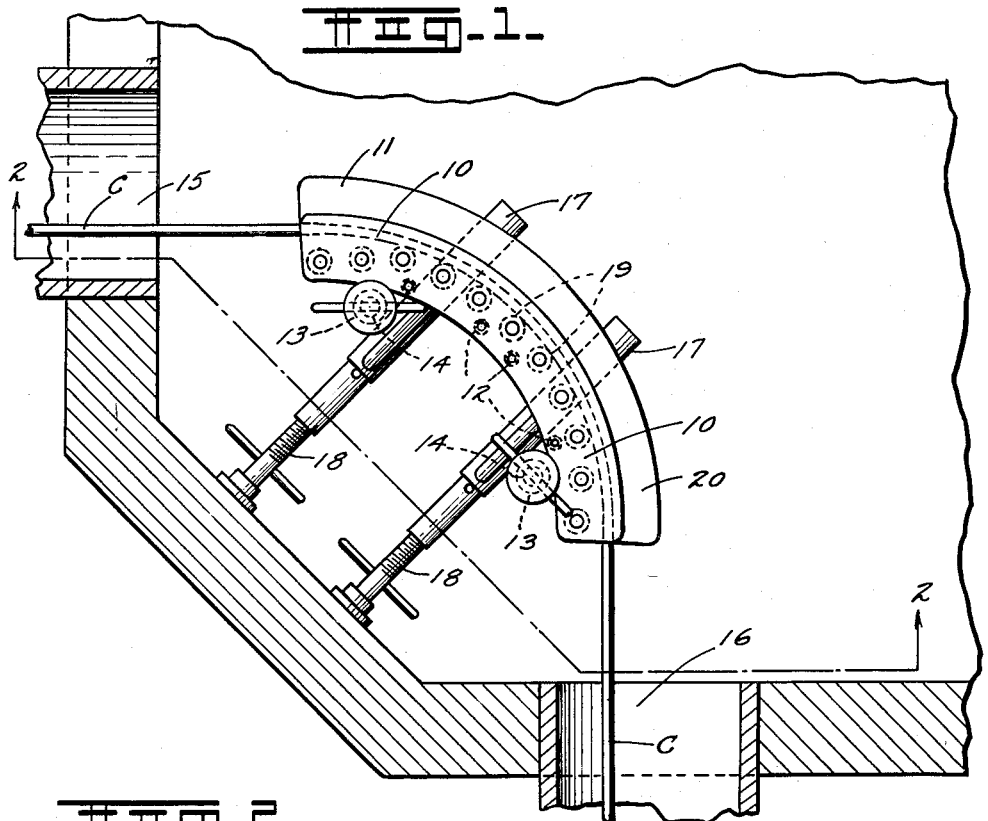
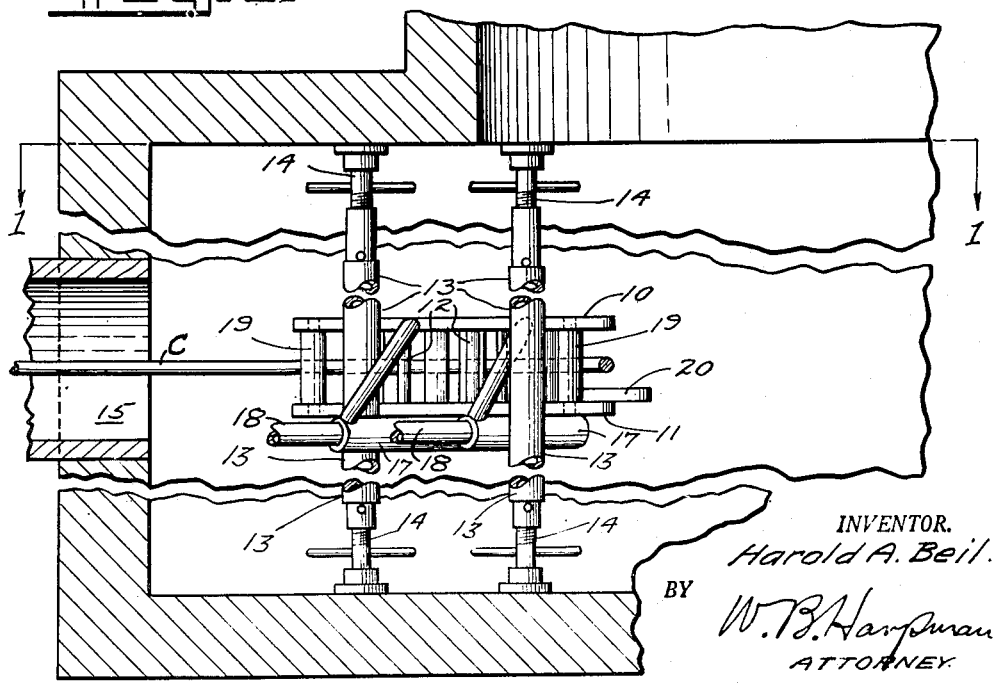
INVENTOR.
Harold A. Beil.
BY W. B. Hauptman
ATTORNEY.

Patented Feb. 24, 1953

2,629,768

UNITED STATES PATENT OFFICE 2,629,768

ARCUATE ROLLER CONVEYER FOR CABLES

Harold A. Beil, Youngstown, Ohio

Application July 10, 1951, Serial No. 236,030

3 Claims. (Cl. 175—376)

This invention relates to an arcuate roller conveyor and more particularly to such a device adapted for temporary installation between a pair of adjacent conduits through which a cable is to be positioned so that the cable may be pulled over the device and its installation facilitated.

The principal object of the invention is the provision of an arcuate roller conveyor and means for mounting the same adjacent a pair of cable conduits.

A further object of the invention is the provision of an arcuate roller conveyor capable of handling various sized cables.

A still further object of the invention is the provision of an arcuate roller conveyor having means for retaining a cable thereon in slack position.

The arcuate roller conveyor for cables disclosed herein comprises an improvement in the art of devices facilitating the pulling of cables such as electric cables through conduits and particularly where conduits terminate in manholes and the cable is led from one conduit to another and at an angle with respect thereto.

It has heretofore been necessary when pulling cables and particularly long lengths of cables to position a large pulley wheel or sheave between adjacent conduit ends and train the cable over the sheave or pulley to facilitate the pulling of the cable. It has been proposed to use more than one pulley and sheave in an arcuate arrangement and the difficulty with such constructions lies in the inability to maintain the cable properly on the sheaves or pulleys, as the case may be, during alternate tension and slack periods. Additionally, the cramped space available in the manholes adjacent the conduit ends renders the installation of such devices difficult and sometimes impossible.

The present invention relates primarily to a relatively small and compact arcuate roller conveyor which may be easily installed in a minimum of space and which will operate efficiently to guide a cable about an angle between adjacent conduit ends which will hold the cable in slack and in tension and which is capable of receiving various sizes of cables.

With the foregoing and other objects in view which will appear as the description proceeds, the invention resides in the combination and arrangement of parts and in the details of construction hereinafter described and claimed, it being the intention to cover all changes and modifications of the example of the invention herein chosen for purposes of the disclosure, which do not constitute departures from the spirit and scope of the invention.

The invention is illustrated in the accompanying drawing, wherein:

Figure 1 is a top plan view of the arcuate roller conveyor in operative position.

Figure 2 is a horizontal view taken on line 2—2 of Figure 1.

By referring to the drawings and Figures 1 and 2 in particular it will be seen that the arcuate roller conveyor comprises a pair of spaced arcuate body members 10 and 11 which are held in spaced relation by a plurality of spacing members 12, a pair 13 of which are longer than the others and are tubular to receive a pair of longitudinally extensible jack posts 14.

As shown in Figures 1 and 2 of the drawings, the body members 10 and 11 are spaced vertically and the jack posts 14 are positioned vertically and the arcuate roller conveyor is positioned in a manhole between the ends of a pair of conduits 15 and 16 which are positioned at right angles to one another. It will be obvious to those skilled in the art that the arcuate roller conveyor may also be positioned with the jack posts 14 in horizontal position so that a cable may be led into or pulled from a manhole over the device which is then positioned with the body members 10 and 11 on a vertical plane rather than a horizontal plane as disclosed.

The body members 10 and 11 also carry a pair of horizontally disposed tubular members 17 which are preferably positioned beneath the body member 11 and which are adapted to position a pair of longitudinally extensible, secondary jack posts 18—18. The jack posts 14 and the secondary jack posts 18—18 are preferably formed for telescopic extension with portions threadably engaging each other so that the device is readily positioned in a manhole and is thereby capable of supporting the tension of a cable pulled thereover.

The body members 10 and 11 have a plurality of rollers 19 journaled at their ends in the body members 10 and 11 and positioned therebetween, the rollers 19 lying in an arcuate pattern similar to the arcuate shape of the body members 10 and 11 with the exception that at the ends of the arcuate body members 10 and 11 the arcuate pattern of the rollers 19 is changed so that they form segments of a smaller diameter, as best shown in Figure 1 of the drawings. The device is thus capable of being utilized between the adjacent ends of various conduits whether the same are at a 90 degree angle with respect to one another or not.

The body member 11 is provided with an arcuate shelf 20 which projects well beyond the face of the rollers 19 and which provides a convenient and practical platform for a cable C when the same is in slack position as when the same is positioned about the device in a cable pulling operation. It will be understood that at such time as the cable C is under tension, as in an actual pulling operation, it will seek a horizontal level against the vertical rollers 19 corresponding generally with the positions in the conduits 16 occupied by the cable C. Alternately, when the device is used in vertical position, as in positioning a cable into a manhole and into a conduit communicating therewith, the shelf 20 and the projecting edge of the body member 10 form spaced guides particularly suitable in positioning the cable during the operation.

It will thus be seen that the arcuate roller conveyor disclosed herein may be simply and easily constructed and that it forms a continuously supporting, arcuate surface for a cable whether the cable is of large or small diameter and that it thereby facilitates the pulling of greater lengths of cables than has heretofore been possible and without splicing the same.

It will also be observed that the formation of the arcuate body members 10 and 11, including the projecting shelf 20, provide desirable guides for a cable being positioned on the device and enable the device to retain a cable in operative position regardless of whether it is under tension or in slack condition.

It will thus be seen that the several objects of the invention have been met by the arcuate roller conveyor for cables disclosed herein.

Having thus described my invention, what I claim is:

1. An arcuate roller conveyor for cables comprising a pair of arcuate body members spaced with respect to one another and having a plurality of rollers therebetween journaled therein, said rollers journaled inwardly from the forward edges of said arcuate body members, the body members each having an outer curved marginal portion projecting beyond the faces of the rollers, said projecting outer marginal portions being of sufficient width to form guides for a cable trained over the rollers, tubular members rigidly secured to said body members at right angles to one another, and jack posts engaged in said tubular members for positioning said arcuate roller conveyor between the adjacent ends of a pair of conduits.

2. An arcuate roller conveyor for cables comprising a pair of oppositely disposed arcuate side plate members secured together in laterally spaced relation, a plurality of rollers disposed transversely in curved formation between the side plate members and journaled therein, the side plate members projecting forwardly beyond the faces of the rollers sufficiently to form guides for a cable trained over the rollers, a pair of tubular members rigidly secured to the side plate members and extending rearwardly therefrom, jack posts engaged in said tubular members, a tubular member rigidly secured to the side plate members and extending transversely at the rear side thereof to either side of the same at right angles to said first mentioned tubular members, and jack posts engaged in opposite end portions of said last mentioned tubular member, the jack posts engaging the several tubular members providing for positioning the arcuate roller conveyor between the adjacent ends of a pair of conduits.

3. An arcuate roller conveyor for cables comprising a pair of oppositely disposed arcuate side plate members secured together in laterally spaced relation, a plurality of rollers disposed transversely in curved formation between the side plate members and journaled therein, the side plate members projecting forwardly beyond the faces of the rollers sufficiently to form guides for a cable trained over the rollers, a pair of tubular members rigidly secured to the side plate members and extending rearwardly therefrom, jack posts engaged in said tubular members, a pair of tubular members rigidly secured to the side plate members and extending transversely at the rear side thereof at either side of the central part of the same at right angles to said first mentioned tubular members, jack posts engaged in opposite end portions of each of the transversely extending tubular members, the jack posts engaging the several tubular members providing for positioning the arcuate roller conveyor between the adjacent ends of a pair of conduits.

HAROLD A. BEIL.

REFERENCES CITED

The following references are of record in the file of this patent:

UNITED STATES PATENTS

| Number | Name | Date |
|---|---|---|
| 1,865,113 | Kiesel | June 28, 1932 |
| 2,286,781 | Abramson | June 16, 1942 |